Dec. 5, 1967        J. GALVAGNI        3,356,911
MINIATURE CAPACITOR WITH ELECTRODES AND DIELECTRIC SEALS
Filed May 29, 1964        3 Sheets-Sheet 1
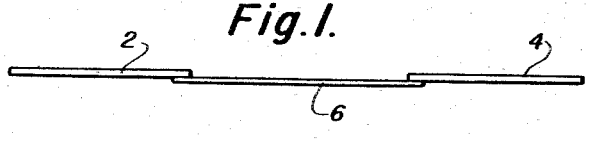
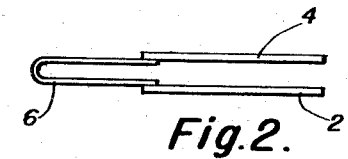
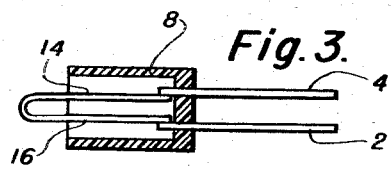
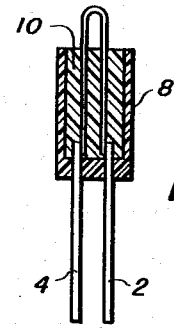
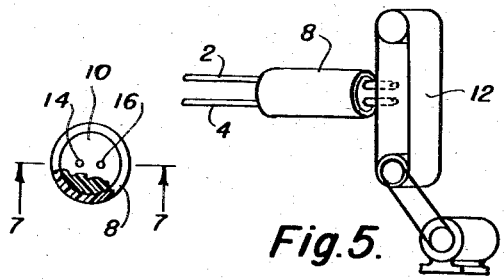
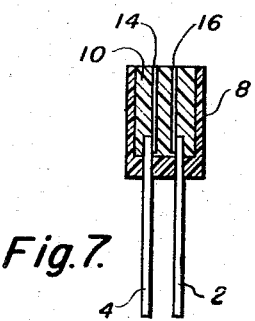
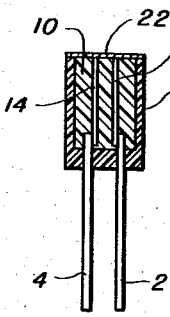
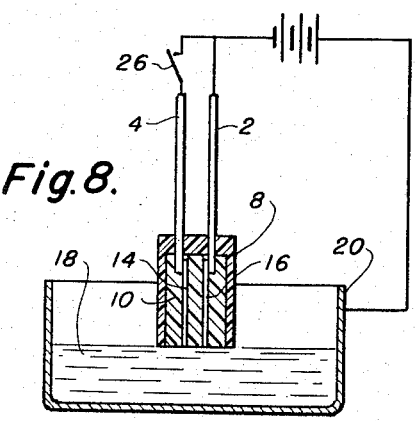
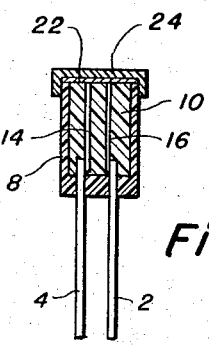
Inventor
John Galvagni
by Rinesmith Rines
Attorneys Dec. 5, 1967   J. GALVAGNI   3,356,911
MINIATURE CAPACITOR WITH ELECTRODES AND DIELECTRIC SEALS
Filed May 29, 1964   3 Sheets-Sheet 2
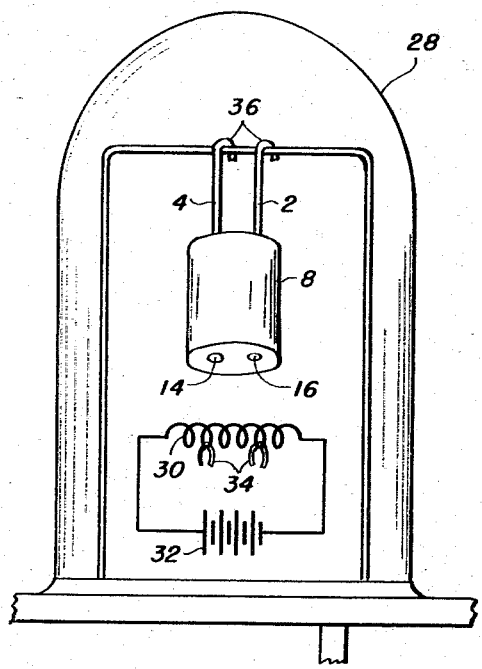
Fig. 11.
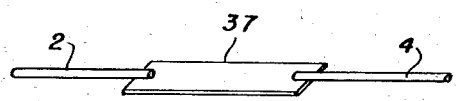
Fig. 12.
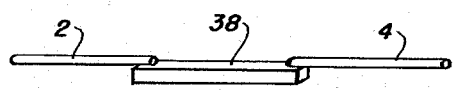
Fig. 13.
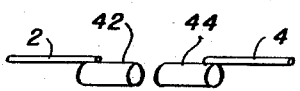
Fig. 15.
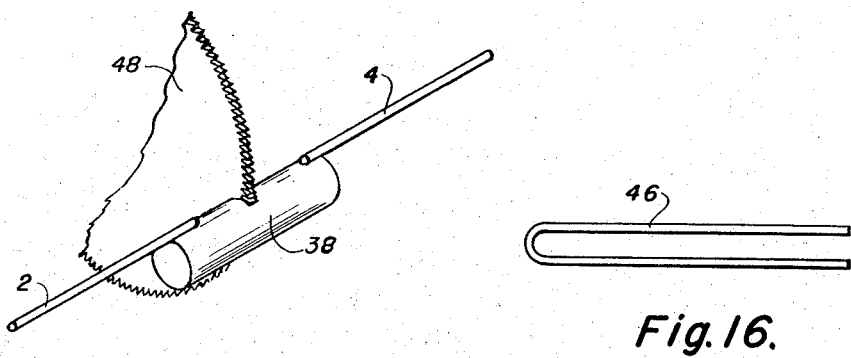
Fig. 14.
Fig. 16.
Inventor
John Galvagni
by Rines and Rines
Attorneys Dec. 5, 1967   J. GALVAGNI   3,356,911
MINIATURE CAPACITOR WITH ELECTRODES AND DIELECTRIC SEALS
Filed May 29, 1964   3 Sheets-Sheet 3

Inventor
John Galvagni
by
Attorneys

United States Patent Office 3,356,911
Patented Dec. 5, 1967

3,356,911
MINIATURE CAPACITOR WITH ELECTRODES
AND DIELECTRIC SEALS
John Galvagni, Bennington, Vt., assignor to Tansitor Electronics, Inc., Bennington, Vt., a corporation of Vermont
Filed May 29, 1964, Ser. No. 371,226
18 Claims. (Cl. 317—230)

ABSTRACT OF THE DISCLOSURE

A capacitor wherein the two electrodes consist of the cross-sectional area of small-dimensioned end surfaces of film-forming metal; the dielectric being the oxide of that film-forming metal, which may be on one or both electrodes; said oxidized or non-oxidized surfaces being connected with a conductive coating; this coating being protected by an insulating and sealing layer.

Figure 17:
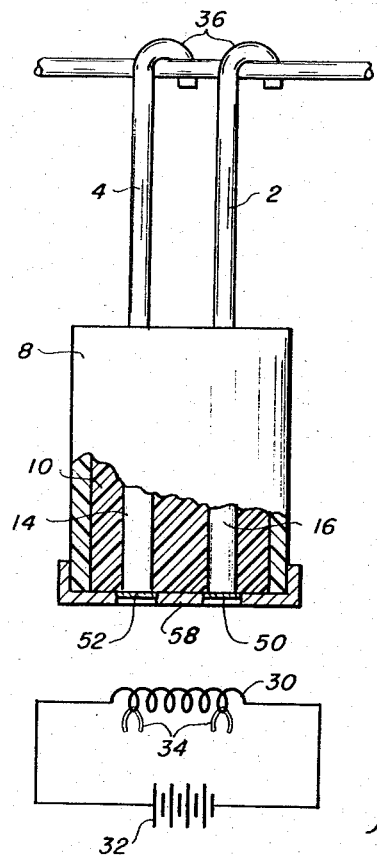

The present invention relates to capacitors, particularly electrolytic capacitors. The invention is more especially related, though not entirely limited, to capacitors of very small capacity, such as of the order of micro-micro or pico ($10^{-12}$) farads; and to capacitors of small dimensions. From a still more particular aspect, the invention is related, though again not completely limited, to capacitors having two electrodes constituted of a refractory, corrosion-resistant, chemically inert metal that is capable of electrolytically forming or anodizing, or becoming coated or covered on its surface, with an anodic chemical and electrically stable dielectric oxide film, which constitutes the dielectric of the capacitor. Among these metals are tantalum, aluminum, zirconium, titanium, niobium, tungsten and hafnium and their alloys. These metals have been described as "valve-forming metals," or "film-forming metals," for the very reason that they are capable of electrolytically forming the said dielectric oxide film on their surfaces when acting as anodes in an electrolytic, film-forming solution. In the case of tantalum, the film is generally understood to be constituted largely, if not wholly, of an amorphous tantalum pentoxide.

To avoid circumlocution of language, the word tantalum, or the words film-forming metal, or their equivalent, will, at times, be employed in the specification, as a generic term, to include all these film-forming or valve-forming metals. In the claims, these metals will similarly be described generically as film-forming metals, or oxide-film-forming metals, or by equivalent language.

The invention is applicable to capacitors of both the non-polar type, especially adapted for use with alternating current, when both electrodes of the capacitor may be constituted of tantalum or film-forming metal, and to capacitors of the polar type, when one or both of the electrodes may be so constituted.

An object of the invention is to provide a new and improved very-small-capacity capacitor.

Another object is to provide a very small-dimensioned capacitor.

Other and further objects will be explained hereinafter and will be particularly pointed out in the appended claims.

According to a feature of the present invention, two small-length and small-cross-dimensioned or small-cross-sectional-area insulated electrodes, of tantalum or film-forming metal, are coated or covered with an oxide film of the metal upon the surfaces only of their small-cross-dimensioned or small-area ends. By reason of this construction, the capacitor becomes non-polar. Since there is no electrolyte between them, the film-coated or film-covered end surfaces of the electrodes are connected by a conductor. The working surfaces of the electrodes are constituted of these small cross-sectional end areas. The extremely low micro-micro or pico-farad capacity is contributed to by reason of the very small areas of these small-film coated or covered end surfaces.

According to further features of the invention, however, one only of the two electrodes may be so provided with the said oxide film; one only of the electrodes may be of the said small dimensions; and there are also other modifications.

According to a preferred embodiment of the invention, external leads are attached to a piece of tantalum or other film-forming metal of small length and small cross-dimension or cross-sectional area. The piece of metal may be in the form of a wire, or a ribbon or foil, or any other suitable physical form. If a wire, ribbon, or foil or the like is employed, it is then bent into U shape, and imbedded in a suitable insulating medium, such as epoxy, in a container. The bend of the wire, ribbon or foil or the like and the epoxy and the adjacent portions of the walls of the container are then ground away, to expose the ends of the arms of the U. Equivalent procedures are followed for pellets or other pieces of metal not in the form of wires, ribbons, or foils; and the bending and grinding steps may be eliminated by using separate metal pieces to start out with. An oxide film is then coated or electrolytically formed upon each of the said exposed ends of the said arms, and the thus coated or covered ends are thereafter connected by a conductor. A non-polar capacitor becomes thereupon produced. A polar capacitor may be produced by similarly coating or forming the said end of one only of the electrodes.

According to a modification, the piece of metal need not be of the said film-forming type. The said end or ends of the piece or pieces of metal will still be coated or covered, however, with an oxide film of the said type.

According to a further modification, one only of the electrodes may be of the said small dimensions. Other modifications also are within the scope of the invention, as will hereinafter appear.

Figure 18:
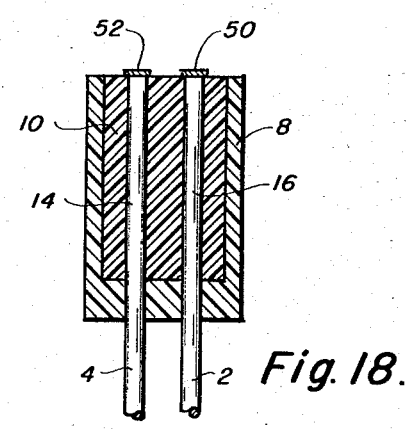
Figure 19:
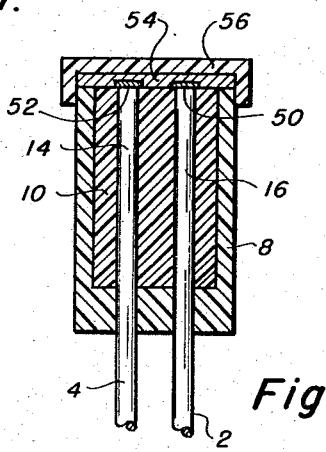
Figure 20:
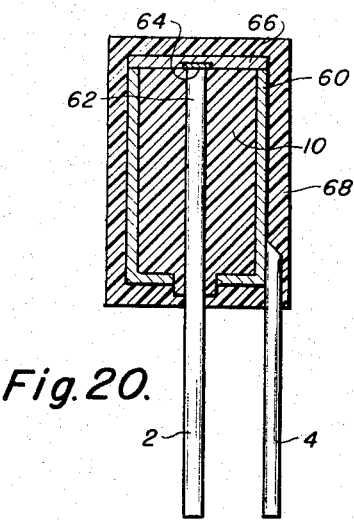

The invention will now be more fully explained in connection with the accompanying drawings, in which FIG. 1 is a view, exaggerated in size, for clearness, of a very-small-diameter small-length tantalum wire to the ends of which two metal leads have been secured, as by welding; FIG. 2 is a similar view, illustrating the wire after it has been bent into a U-shape; FIG. 3 is a similar view, with the bent tantalum wire and its attached metal leads that is illustrated by FIG. 2 mounted in a casing or housing, shown in longitudinal cross-section; FIG. 4 is a view similar to FIG. 3, but illustrating, in cross-section, an insulating medium, such as epoxy resin, introduced into the casing or housing; FIG. 5 is a perspective, illustrating a preferred step of grinding away the free end portion of the casing or housing, illustrated at the top of FIG. 4, together with the epoxy and the upper bent portion of the wire contained therein, thus separating the arms from the bend of the U; FIG. 6 is an end view, partly broken away, of the device that is shown in FIGS. 4 and 5, after it has been thus ground down; FIG. 7 is a longitudinal section of the same, similar to FIG. 4, taken upon the line 7—7 of FIG. 6, looking in the direction of the arrows; FIG. 8 is a diagrammatic view illustrating apparatus for anodizing, forming or oxide-film-coating the free exposed cross-sectional areas of the ground-away arms of the said U; FIG. 9 is a longitudinal section similar to FIG. 7, but illustrating a conductor mounted in contact with the said anodized ends of these arms; FIG. 10 is a similar longitudinal section of a complete capacitor embodying a preferred embodiment of the present invention; FIG. 11 is a diagrammatic view of a vapor-deposition apparatus, for the purpose of evaporating a conductor on and between the now anodized electrodes; FIG. 12 is a view similar to FIG. 1 of a modification, according to which a ribbon or foil may be employed, instead of the wire that is illustrated by FIG. 1; FIG. 13 is a view similar to FIGS. 1 and 12, illustrating the use of a pellet, instead of the said wire, illustrated by FIG. 1, or the said ribbon or foil, illustrated by FIG. 12; FIG. 14 is a view similar to FIG. 13, illustrating a step of cutting a pellet, such as is illustrated by FIG. 13, though shown cylindrical, instead of square cross-section; FIG. 15 is a view similar to FIGS. 1, 12 and 13, illustrating either the pellet that is illustrated by FIGS. 13 and 14, after it has been cut, or the use of two separate pellets, which use avoids the cutting step that is illustrated by FIG. 14; FIG. 16 is a view, similar to FIG. 2, of a modification, according to which a metal other than the before-described film-forming metal may be employed; FIG. 17 is a view similar to FIG. 11, illustrating a step of vapor-depositing an oxide film upon a non-film-forming metal in accordance with the present invention; FIG. 18 is a longitudinal section, similar to FIG. 7, of a capacitor embodying the present invention, the electrode or electrodes of which are constituted of non-film-forming metal, but provided with end surfaces of a film-forming metal that have been vapor-deposited as illustrated by FIG. 17, then formed; FIG. 19 is a fragmentary longitudinal section, similar to FIG. 18, but, like FIG. 10, illustrating a complete capacitor; and FIG. 20 is a view of a further modified capacitor, one of the electrodes of which, which may be the anode, is formed, and the other of which, which may or may not be the casing itself, is not formed, and may serve as the cathode.

Referring first to FIG. 1, nickel, or other suitable external leads 2 and 4, that are intended to be used for the usual reasons of solderable or other electrical connections, are shown attached, as by welding, to the ends of a very short wire 6, of very small dimensions, say, more or less, about 2/10 of an inch long and about 0.005 to 0.03 of an inch in thickness or cross section. According to the preferred embodiment of the invention, this wire 6 is constituted of tantalum or some other of the film-forming metals before mentioned.

The wire 6 is then bent into U-shape, as illustrated by FIG. 2, and the bent portion of the wire and the adjacent portions of the leads 2 and 4 attached thereto are then mounted in a container, in the form of a casing or housing 8 that is open at one end, as illustrated by FIG. 3. The other end of the housing or casing 8 may be closed, except for two drilled or otherwise-provided openings therethrough, through which the leads 2 and 4 may be slipped during the mounting of the bent wire 2 in the casing or housing 8. The casing or housing 8 may be constituted of any suitable material, metal or insulation. If constituted of metal, however, as is obvious, provision should be made for preventing short-circuiting of the capacitor electrodes. A suitable insulating material for the casing or housing 8, for example, is an epoxy resin.

An insulating fill medium 10 is then introduced into the casing or housing 8, as is shown in FIG. 4. This insulating medium 10 may, like the casing or housing 8 itself, be also constituted of an epoxy resin. It may be poured into the casing or housing 8 while in liquid form, and then allowed to solidify. In FIG. 4, the epoxy 10 is shown covering parts only of the arms of the U of the wire 6. Other methods of embedding the arms of the wire 6 in an insulating material 10 may also be employed; the contact between these arms and the insulation should, however, be initimate.

The bent portion of the wire 6, as well as adjacently disposed portions of its said arms, and also portions of the open end of the casing of housing 8, together with the insulating medium 10 contained therein, are now ground away, in any desired manner, as by means of an electric-belt sander 12, shown in FIG. 5. The said arms of the bent wire 6 become thus converted into two electrodes 14 and 16, with their ground-away free ends exposed at the open end of the casing or housing 8, substantially flush with an upper or first surface of what is left of the insulative solid body 10, as shown in FIGS. 6 and 7.

The two end surfaces only of these ground-away free ends of the tantalum electrodes 14 and 16 are then electrolytically formed, to coat them with the before-described oxide film, as illustrated by FIG. 8. This may be effected by causing these two end surfaces barely to touch the surface of a suitable formation, oxygen-supplying ionizable electrolyte solution 18, and applying a suitable voltage between the external leads 2 and 4, or the electrodes 14 and 16, as positive electrodes, and a suitable cathode 20, which may be the electrolyte-containing casing of the apparatus.

The figured voltage will vary, as is known, with different-sized electrodes. On 0.005 inch diameter tantalum electrodes, for example, it is found that a 100 volt formation will yield a 9 picofared capacitor; whereas, at the same voltage, a 0.010 inch diameter will yield a 30 picofarad capacitor, and a 0.020 inch diameter will yield a 90 picofarad rating.

This completes a description of the essentials of a preferred capacitor of the present invention. It remains only, since no liquid electrolyte is employed, in which to dispose these electrolytically formed electrodes 14 and 16, to supply an equivalent thereof or a substitute therefor. This is shown at 22, FIG. 9 in the form of a conductor or conductive-bridge coating connection between them. This conductor 22 provides the same electrical link, or an equivalent thereof, between the tantalum-oxide dielectric films on the electrodes 14 and 16, that is customarily provided by liquid electrolytes in conventional electrolytic capacitors.

The conductor 22 may be applied, for example, by several times dipping the unit in manganese nitrate, after first mechanically roughening the tantalum end surfaces before described, previous to the before-described formation procedure, illustrated by FIG. 8, and then pyrolitically converting this chemical into the semi-conductor manganese dioxide. The unit may or may not then be dipped into a graphite suspension, and dried, after which a silver paste may or may not be painted thereon, to serve as a further conductor.

Other methods of applying the conductor 22, so as similarly to cover the dielectric films intimately, may also be employed, one of which is illustrated by FIG. 11, which shows the unit that is illustrated by FIG. 7, after it has been treated as illustrated by FIG. 8. In this FIG. 11, this unit is shown mounted in the upper portion of a high-vacuum bell jar 28, in the lower portion of which there is positioned a heating filament 30 that may be heated by means of a battery 32. The unit may be supported in the bell jar 28 in any desired manner, as by means of hooks 36, which may be made, as illustrated, by temporarily bending the ends of the leads 2 and 4. Pieces of metal 34, the vapor of which is to be deposited, are illustrated diagrammatically as hooked into the coils of the heating filament 30. This metal may be silver, aluminum, gold, or any other suitable metal. The vaporized metal ascends in the bell jar 28, and becomes deposited on the said free end surfaces of the electrodes 14 and 16 and the intervening surface of the unit. The vaporized metal becomes thus vapor-deposited on to the selected surface, in the presence of a high vacuum.

After the conductor 22 has been applied, the unit is next enclosed in an outer insulating case, shown in FIG. 10 as a protective cap 24, in order to provide physical strength and insulation. This protective cap 24 may also be constituted of an epoxy, or it may be constituted of a silicon rubber or other suitable insulating material. It provides an insulated body within which is embedded the above-mentioned upper surface of the insulative body 10, with which the ground-away free ends of the electrodes 14 and 16 are substantially flush. It provides also an insulative covering sealing the conductive coating 22.

The working surfaces of this capacitor are provided by the oxide-film-coated cross-sectional areas at the very ends of the small-cross-section electrode wires or elongate metal pins 14 and 16. Since these end surfaces of the electrodes 14 and 16, moreover, as above described, are both electrolytically formed or coated or covered with the oxide film, the capacitor becomes non-polar.

In accordance with the present invention, therefore, the working surface area of each of the two electrodes 14 and 16 is greatly decreased. With wires of 5/1000 to 30/1000 of an inch cross-section, the electrolytically formed or oxide-film coated or covered end surface areas of the electrodes 14 and 16 range from about 0.000020 to about 0.00070 square inch. The electrodes 14 and 16 may be as close together as one-sixty-fourth of an inch, but, within suitable limits, they could be closer or farther apart. The oxide-coated-film surface area thus formed is of the same order of magnitude as that of a piece of ribbon or foil 3/1000 of an inch square. The leads 2 and 4, projecting from the respective electrodes beyond the solid insulative body 10, exposed at a lower or second surface thereof, serve as terminals for the capacitor.

The capacitance of the capacitor, thus produced, becomes lowered by two factors. One of these factors arises out of the fact that the capacitance of a capacitor is directly proportional to the area of its electrodes; and this area, according to the present invention, as before stated, is minutely small. The other factor arises out of the fact that, since both electrodes 14 and 16 are formed, as above described, either may constitute the anode; wherefore, the effective dielectric thickness of the oxide dielectric, which is inversely proportional to the capacitance of the capacitor, becomes thereby doubled, and the capacitance, therefore, halved.

According to the present invention, in effect, therefore, the effective surface area of each capacitor electrode 14 and 16, namely, the anodized or otherwise oxide-film-coated end surface, has been reduced to substantially that of the cross-sectional area of the said wire 6. Only the electrolytically formed or oxide-coated end surfaces of the electrodes 14 and 16 are predominant areas, and they alone are effective. The remainder of these electrodes 14 and 16, throughout their lengths have become entirely masked in the epoxy 10. The conductor 22 does not contribute substantially to the effective dielectric thickness. It does, however, by virtue of its low resistance, and low dielectric constant, provide some tolerance in the spacing of the electrodes 14 and 16.

If, however, some slight portions of the electrodes 14 and 16 should project above the surface of the insulating medium 10, so as to become unmasked, the value of the capacitance of the capacitor would be affected thereby accordingly. In fact, such projecting portions of the electrodes 14 and 16 could be used designedly, in order to increase the capacitances of the capacitor. Even in such cases, however, the oxide film still covers substantially the end surfaces only of the electrodes 14 and 16.

Though the invention has been described above principally in connection with the non-polar form of the capacitor, certain features thereof may be used also in polar capacitors. To this end, all that is necessary is to form or anodize one only of the electrodes 14 and 16; say, the electrode 16. This may be effected by, for example, opening a switch 26, FIG. 8, in the forming circuit of the other electrode; say, the electrode 14.

Though the invention has been described above in connection with the tantalum wire 6, it will be obvious that other metal pieces than wires may also be employed. In FIG. 12, for example, the tantalum wire 6 is replaced by a ribbon or foil 37. In other respects, the same steps of manufacture of the capacitor may be followed as those described above. In FIG. 13, the tantalum wire 6 and the tantalum ribbon 37 are shown replaced by a tantalum pellet 38, which may be of any desired cross-section, illustrated as rectangular in FIG. 13 and round in FIGS. 14 and 15.

In this instance, the bending step that is illustrated by FIG. 2 may be replaced by a cutting step, which may be performed by a knife or saw 48, as illustrated by FIG. 14. As is illustrated by FIG. 15, indeed, pellets 42 and 44 may be employed separately to start out with, thus avoiding the need for the use of the belt-sander or grinder 12, of FIG. 5 or the knife or saw 48 of FIG. 14.

In cases other than when the wire 6 is used, the foil, pellet or other physical device, with the external leads 2 and 4 attached thereto, would still be embedded in the insulating medium 10, it would still, if previously uncut, be cut in two, whether by grinding, sawing or some other manner, the end surface of its cut portions would still be electrolytically formed or oxide-coated, and those end coated surfaces would still be connected by a conductive bridge, like the conductive bridge 22.

As a further modification, there is disclosed, in FIG. 16, corresponding to FIG. 2, a continuous wire that may be constituted, for example, not of a film-forming metal, but of nickel, iron or any other suitable metal, without the necessity for welding the leads 2 and 4 to its ends. It may be bent in the same manner as illustrated by FIG. 2, and the same subsequent steps may be followed that are illustrated by, for example, FIGS. 3 to 7 inclusive, 8 and 9. This modification has the advantage that it is adapted to the use of a very much shorter casing 8. This shorter casing 8, furthermore, can be ground down to very short wires. This may be better understood by reference to FIGS. 17, 18 and 19.

In FIG. 17, for example, there is shown a capacitor that is similar to the capacitor that has been described above, except that the electrodes 14 and 16 thereof may, in this case, be constituted of some non-film-forming metal such as iron. The vapor of tantalum or other film-forming metal 34 may be deposited, as shown at 50 and 52, FIGS. 17 and 18, through the holes in mask, 58, on to the extreme end surfaces of these electrodes 14 and 16. An oxide film may then be applied, as described, for example, in connection with FIG. 8. A conductor 54 corresponding to the conductor 22 of FIG. 10, may be applied as previously described, and a protective cap 56, corresponding to the protective cap 24 of FIG. 10, may be added, as illustrated by FIG. 19.

The invention is here the same, namely, the control, by a small area, represented by the end-surface areas 50 and 52, for very low picofarad ratings. The purpose, in all instances, is to obtain a broad spectrum of area, in order to control a micro-micro-farad rating from one to several thousands.

It is not essential, however, that both electrodes be of the same small cross-dimension. In fact, certain advantages may be obtained by having the cathode of area larger than that of the anode. Theoretically, indeed, as explained, for example, in Letters Patent 2,871,426, to H. H. Hilton and Alfred F. Torrisi, the cathode area should be as large as possible.

In FIG. 20, therefore, the cathode is shown as the casing 60 itself, with the cathode lead 4 connected thereto; and the other electrode, the anode 62, is shown disposed centrally thereof, with the lead 2 extending therebeyond and insulated therefrom. It will be understood, however, that the cathode 60 may be constituted of an electrode other than the casing. Both electrodes 62 and 60 may be formed, or one only, the anode 62, according to the principles before described. In the case of the anode 62, if of nickel, for example, an oxide film 64, at the end thereof, may be either vapor-deposited, as described above in connection with FIG. 17, or it may be attached in the form of a layer of the film-forming metal, which may then be oxide-coated as before described. A conductive bridge 66, corresponding to the conductive bridge 22 of FIG. 10, may then be applied to connect the anode dielectric oxide film 64 and the cathode case 60.

A polar capacitor may thus be provided, with the conductive bridge 66 linking the anode-dielectric 64 to the cathode case 60. With increase of the size of the cathode, in this instance, the contact area of the cathode naturally becomes increased with the use of the said conductor 66, thereby lowering the resistance. By making the anode bigger, the capacitance would be increased.

The unit is now complete, except for protection, which may be obtained by means of the cap 24 or 56. The whole unit may be insulated, as shown at 68, except for the projecting anode and cathode leads 2 and 4.

It will be observed that the leads 2 and 4 serve, as in conventional electrolytic capacitors, to connect the electrodes 14 and 16, or 60 and 62, or their equivalents, in series, to a source of voltage, in order to provide a series current between the electrodes, and the oxide films at the said ends of the electrodes.

Further modifications will occur to persons skilled in the art, and all such are considered to fall within the spirit and scope of the present invention, as defined in the appended claims.

What is claimed is:

1. A capacitor comprising a solid insulative body and at least one electrode including an elongate metal pin from about 0.005 to 0.030 inch diameter embedded therein, said pin having an end surface of film-forming metal substantially flush with a first surface of said insulative body and a first terminal exposed at a second surface thereof, an anodic oxide dielectric film formed on said end surface, a conductive coating on said first surface of the insulative body and covering the dielectric film, a second terminal in electrical contact with said conductive coating, and an insulative covering sealing the conductive coating.

2. A capacitor as recited in claim 1 wherein the pin is constituted of film-forming metal.

3. A capacitor as recited in claim 2 wherein the pin is constituted of tantalum.

4. A capacitor as recited in claim 1 wherein the pin is constituted of non-film-forming metal.

5. A capacitor as recited in claim 1 wherein the anodic oxide dielectric film is formed substantially solely on said end surface.

6. A capacitor as recited in claim 1 wherein the insulated solid body is contained in an insulative casing.

7. A capacitor as recited in claim 1 wherein the second terminal comprises a conductive casing in which the insulated solid body is contained.

8. A capacitor comprising a solid insulative body and at least two elongate metal pins from 0.005 to 0.030 inch diameter embedded therein, each of said pins having an end surface of film-forming metal substantially flush with a first surface of said insulative body and a terminal exposed at a second surface thereof, an anodic oxide dielectric film formed on each of said end surfaces, a conductive coating on said first surface of the insulative body and covering the dielectric films, and an insulative covering sealing the conductive coating.

9. A capacitor as recited in claim 8 wherein the insulated solid body is contained in an insulative casing.

10. An electrolytic capacitor comprising an insulative solid body and at least a first electrode including an elongate metal pin embedded therein, said pin having an end surface of film-forming metal substantially flush with a surface of said insulative body, a dielectric oxide film formed on said end surface, a solid electrolyte intimately covering the dielectric film, a metal second electrode in electrical contact with said electrolyte, and an electrical terminal projecting from each of said electrodes respectively.

11. A capacitor as recited in claim 10 wherein said second electrode comprises an elongate pin embedded in said insulative body in spaced relation with said first electrode elongate pin.

12. A capacitor as recited in claim 11 wherein said second electrode elongate pin comprises an end surface of film-forming metal substantially flush with said surface of the insulative body, a dielectric oxide film formed on said end surface of said second electrode pin, and said solid electrolyte comprises a portion intimately covering said dielectric film of said second electrode pin.

13. A capacitor as recited in claim 10 wherein the pin is constituted of film-forming metal.

14. A capacitor as recited in claim 13 wherein the pin is constituted of tantalum.

15. A capacitor as recited in claim 10 wherein the pin is constituted of non-film-forming metal.

16. A capacitor as recited in claim 10 wherein the pin is of cross-section about 0.005 to 0.03 inch.

17. A capacitor as recited in claim 10 wherein the insulated solid body is contained in an insulative casing.

18. A capacitor as recited in claim 10 wherein the second electrode comprises a conductive casing in which the insulated solid body is contained.

References Cited

UNITED STATES PATENTS

| 2,398,176 | 4/1946 | Deyrup | 29—25.42 |
|---|---|---|---|
| 2,504,178 | 4/1950 | Burnhaw et al. | 317—230 |
| 2,526,207 | 10/1950 | Donley et al. | 317—258 |
| 2,773,158 | 12/1956 | Myers | 317—235 |
| 3,093,883 | 6/1963 | Haring et al. | 29—25.42 |
| 3,120,182 | 2/1964 | Chessin et al. | 317—242 |
| 3,166,693 | 1/1965 | Haring et al. | 317—230 |
| 3,218,528 | 11/1965 | Heidler | 317—258 |
| 3,239,595 | 3/1966 | Reese et al. | 317—234 |

JAMES D. KALLAM, *Primary Examiner.*